United States Patent
Patel et al.

(10) Patent No.: US 9,831,961 B1
(45) Date of Patent: Nov. 28, 2017

(54) ADAPTIVE ENVELOPE TRACKING CALIBRATION FOR RADIO FREQUENCY COMMUNICATION SYSTEMS

(71) Applicant: Amazon Technologies, Inc., Seattle, WA (US)

(72) Inventors: Pratik Kalpesh Patel, Sunnyvale, CA (US); Jay Praful Desai, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 344 days.

(21) Appl. No.: 14/509,960

(22) Filed: Oct. 8, 2014

(51) Int. Cl.
*H04B 17/13* (2015.01)
*H04B 17/00* (2015.01)

(52) U.S. Cl.
CPC .......... *H04B 17/001* (2013.01); *H04B 17/13* (2015.01)

(58) Field of Classification Search
CPC ..................................................... H04B 17/13
See application file for complete search history.

(56) References Cited

U.S. PATENT DOCUMENTS

| 8,873,677 B1* | 10/2014 | Loh | H04L 27/368 375/295 |
| 2012/0200435 A1* | 8/2012 | Ngo | H03M 7/3073 341/61 |
| 2012/0243592 A1* | 9/2012 | Rupp | H03F 1/0222 375/224 |
| 2014/0057684 A1* | 2/2014 | Khlat | H04W 52/0209 455/574 |
| 2014/0073273 A1* | 3/2014 | Asensio | H03F 1/0211 455/114.3 |
| 2014/0169427 A1* | 6/2014 | Asensio | H03F 1/02 375/224 |
| 2015/0326327 A1* | 11/2015 | Carlsson | H03F 1/0222 375/224 |
| 2016/0072530 A1* | 3/2016 | El-Hassan | H03F 1/0227 455/114.2 |
| 2016/0249300 A1* | 8/2016 | Tsai | H04B 17/13 |

* cited by examiner

*Primary Examiner* — Lewis West
(74) *Attorney, Agent, or Firm* — Lowenstein Sandler LLP

(57) ABSTRACT

An adaptive envelope tracking calibration module executes a routine to calibrate a radio frequency (RF) transmitter in a communication device comprising an envelope tracking system. The routine includes receiving a selection of a calibration target power that is greater than a desired output power of the RF transmitter and determining an output power estimate for the power amplifier as a supply voltage for the power amplifier varies according to an output of the envelope tracking system. The routine further includes adaptively adjusting the calibration target power when the output power estimate is not greater than the calibration target power.

20 Claims, 8 Drawing Sheets

ADAPTIVE ENVELOPE TRACKING CALIBRATION FOR RADIO FREQUENCY COMMUNICATION SYSTEMS

BACKGROUND

Users enjoy entertainment through the consumption of media items, including electronic media, such as electronic books (also referred to herein as ebooks), electronic newspapers, electronic magazines, other electronic publications, audio books, and digital video. Users employ various electronic devices to consume such media items. Among these electronic devices are electronic book readers, cellular telephones, personal digital assistants (PDAs), portable media players, tablet computers, electronic pads, netbooks, desktop computers, notebook computers, and the like. These electronic devices wirelessly communicate with a communications infrastructure to enable the consumption of the digital media items. In order to wirelessly communicate with other devices, these electronic devices include one or more communication systems and corresponding antennas.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
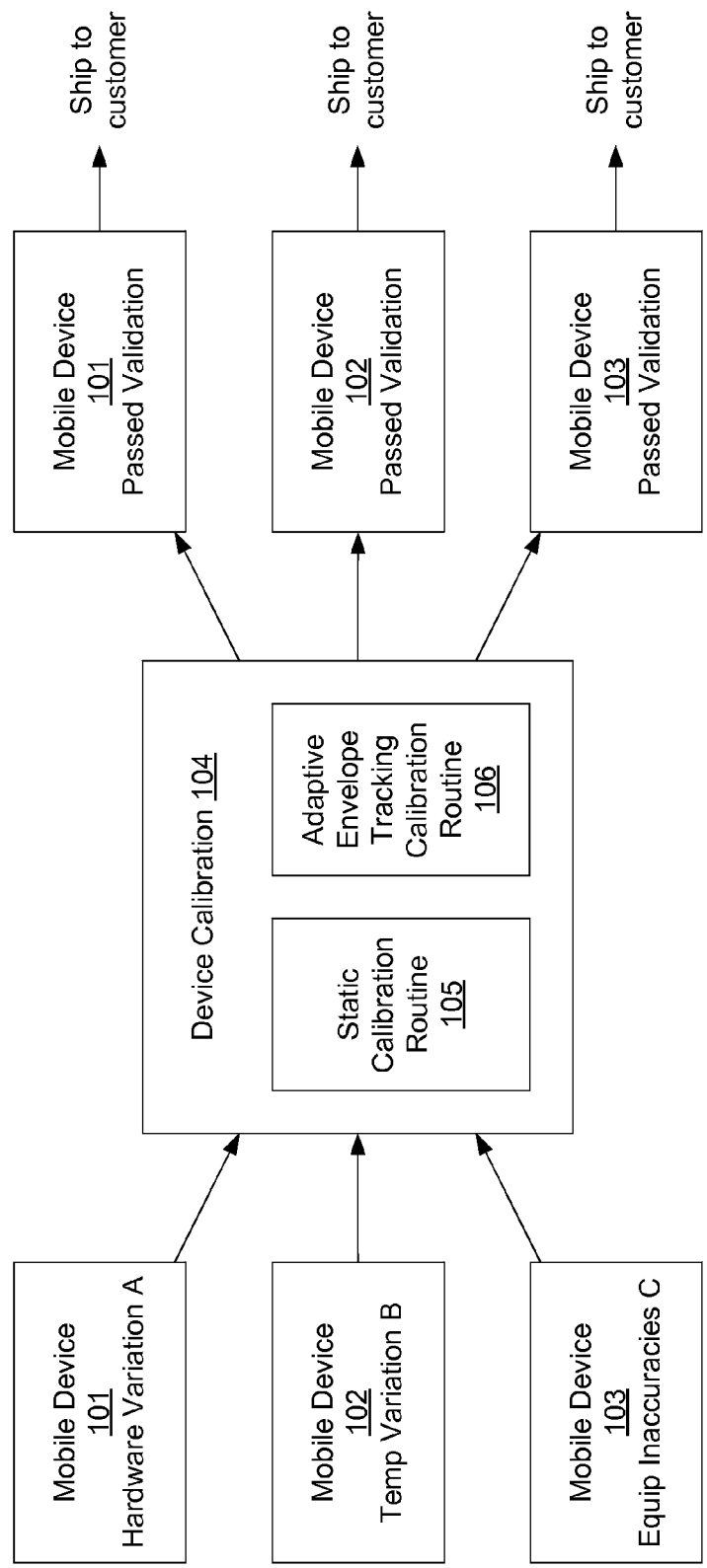
FIG. 1 is a block diagram showing the factory calibration environment for adaptive envelope tracking calibration, according to an embodiment.

Embodiments are described for adaptive envelope tracking calibration for radio frequency communication systems. Envelope tracking (ET) describes an approach to radio frequency (RF) amplifier design in which a power supply voltage applied to the power amplifier is continuously adjusted to ensure that the amplifier is operating at peak efficiency for power required at each instant of transmission. Conventional RF amplifiers were designed with a fixed supply voltage and operate most efficiently only when operating in a compression or saturation mode. Amplifiers operating with a constant supply voltage, however, become less efficient as the crest factor of the signal increases. The amplifiers spend more time operating below peak power and, therefore, spend more time operating below maximum efficiency. Envelope tracking adjusts the voltage applied to an RF power amplifier to deliver the correct power needed at that instant. Envelope information is derived from the IQ modem and is passed to an envelope tracking power supply to provide the required voltage to derive the power amplifier into compression.

In one embodiment where envelope tracking is utilized, the supply voltage of the power amplifier is not a simple linear response to the magnitude of an input signal. For example, the supply voltage depends on the magnitude of input signal in a nonlinear way, such that the gain of power amplifier is constant and becomes independent of the instantaneous supply voltage when the power amplifier operates in an envelope tracking mode. An envelope tracking system may implement a nonlinear transfer function, where the output provides a corresponding supply voltage to the power amplifier. Since the envelope tracking transfer function is nonlinear, however, it may be sensitive to hardware variations in RF communication system. In addition, temperature variations in measurement equipment inaccuracies can lead to variation across devices. As a result the envelope tracking system may be calibrated during production of a mobile communication device including the RF communication system.

In a conventional calibration process, devices are often calibrated in the factory before being sent to customers. The calibration involves having a calibration application send static calibration instructions to the device. The device then executes the requested calibrations according to the received static calibration instructions. At least some calibration instructions, when executed, provide calibration results, which the device may then provide back to the calibration application. Since the calibration instructions are static, however, they may place unnecessary limitations on devices that can actually perform at higher levels due to hardware variations, temperature variations or measurement equipment inaccuracies among different devices. For example, static calibration instructions may specify that given a certain input, the output power of the power amplifier should be a certain value or within a threshold amount of that certain value. If the output power is not within the threshold, the device will fail calibration. Certain devices, however, may be able to achieve a higher output power than that specified by an organization (e.g., the Third Generation Partnership project (3GPP)) or a wireless carrier. For example, if the hardware of the device allows for additional headroom than most devices, setting a higher calibration target power may allow the device to be calibrated for this higher performance level, and then run at a lower power in order to meet the 3GPP or wireless carrier requirements. A device with weaker hardware, however, may not be able to meet the higher calibration target power, even though it is still capable of achieving the desired output power (e.g., as specified by 3GPP or a wireless carrier). As a result, a lower calibration target power may be used for this device. Thus, each device may be calibrated to operate at its peak performance level (e.g., output power level), while still ensuring that each device is capable of meeting a minimum desired performance level (e.g., the output power level specified by 3GPP or a wireless carrier).

By using the adaptive envelope tracking calibration methods described herein, different devices can pass factory calibration in spite of hardware variations, temperature variations or measurement equipment inaccuracies among different devices and different calibrations. The adaptive envelope tracking calibration routine allows stronger devices to have more headroom and weaker devices to have just enough headroom to pass calibration. Accordingly these devices that offer the performance benefits of envelope tracking can be shipped to customers although they may have failed calibration, or been limited to a lower level or performance, when conventional static techniques were used.

FIG. 1 is a block diagram showing the factory calibration environment for adaptive envelope tracking calibration, according to an embodiment. In one embodiment, there are three mobile devices 101, 102, 103 that are to be calibrated 104 in the factory calibration environment. In one embodiment, each of the mobile devices 101, 102, 103 implements envelope tracking so that a power supply voltage applied to a power amplifier in each device is continuously adjusted to ensure that the amplifier is operating at peak efficiency for power required at each instant of transmission. The device calibration stage has the option to implement a static calibration routine 105 or an adaptive envelope tracking calibration routine 106. Since mobile device 101 suffers from hardware variation A, mobile device 102 suffers from temperature variation B, and mobile device 103 suffers from measurement equipment inaccuracies C, all three mobile devices may fail the device calibration 104 when a static calibration routine 105 is utilized. In the static calibration routine 105, calibration instructions may specify that given a certain input, the output power of the power amplifier should be a certain value or within a threshold amount of that certain value. If the output power is not within the threshold, the device will fail calibration. The static calibration routine 105, however, may place unnecessary limitations on mobile devices 101, 102, 103 which could actually perform at higher levels due to hardware variation A, temperature variation B or measurement equipment inaccuracy C.

In one embodiment, however, the device calibration stage 106 may implement adaptive envelope tracking calibration routine 106. Adaptive envelope tracking calibration routine 106 may adaptively adjust a calibration target power value until an output power estimate is greater than the calibration target power value. This allows different devices to pass factory calibration 104, and to be operable at varying performance levels, as a result of hardware variation A, temperature variation B or measurement equipment inaccuracy C. Devices 101, 102, 103 that offer the performance benefits of envelope tracking can thus be shipped to customers after passing calibration.

Figure 2:
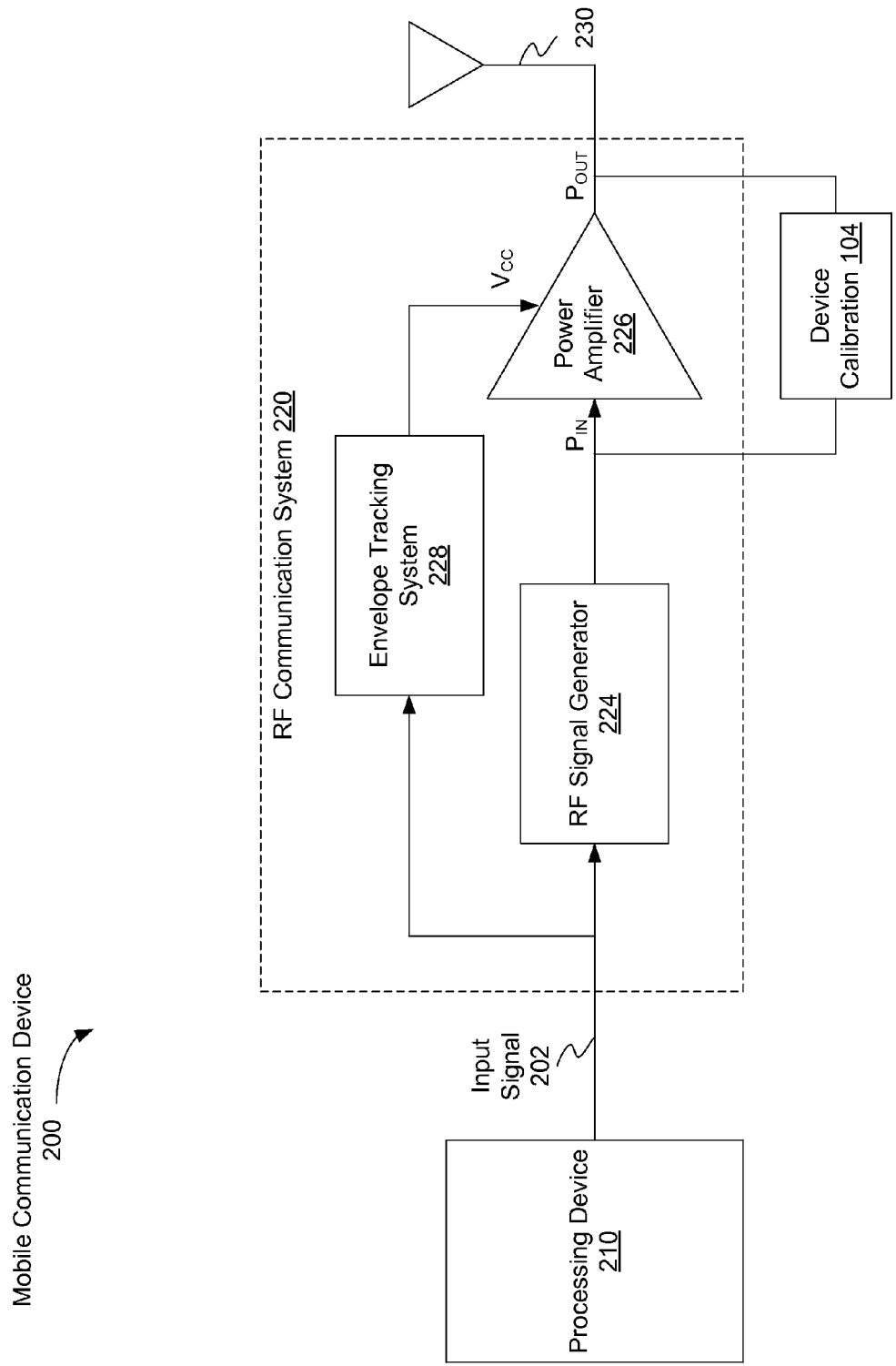
FIG. 2 is a block diagram of an example mobile communication device with radio frequency communication system using envelope tracking, according to an embodiment.

FIG. 2 is a block diagram of an example mobile communication device 200 with a radio frequency communication system 220 using envelope tracking, according to an embodiment. In one embodiment, mobile communication device 200 includes processing device 210 (e.g., a digital baseband processor) and radio frequency (RF) communication system 220. RF communication system may be connected to an antenna 230. In one embodiment, processing device 210 generates signals to be transmitted via the antenna 230 which are forwarded to the RF communication system 220 which generates a transmit signal output to antenna 230 for transmission. The RF communication system 220 may also receive signals from antenna 230 and provide the received signals to processing device 210 for processing. The envelope tracking techniques described herein may be implemented in the RF communication system 220, for example, in a power amplifier or amplifier circuit which may provide the transmit signal output to antenna 230.

Depending on the embodiment, mobile communication device 200 may be a portable mobile communication device and may be configured to perform a voice and/or data communication according to a mobile communication standard with other communication devices, or with base stations of a mobile communication network. Mobile communication device 200 may include a mobile handset, such as a mobile phone or a smart phone, a tablet computer, a broadband modem, a laptop, a notebook, a router, a switch, a repeater, a personal computer (PC) or the like. In one embodiment, mobile communication device 200 may be a base station of a communication network.

In one embodiment, the power amplifier in the RF communication system 220 may be an envelope tracking power amplifier in order to improve an efficiency and/or battery life of mobile communication device 200. One aspect of envelope tracking is that a supply voltage to the power amplifier may not be constant. In one embodiment, the power amplifier supply voltage depends on the instantaneous envelope of an input signal from processing device 210 (e.g., a modulated baseband signal). In one embodiment, the envelope of the input is calculated by an envelope tracking system, which in turn generates a variable power amplifier supply voltage. It is expected that an envelope tracking capable device converter will reduce the battery current of a LTE (Long Term Evolution) signal at maximum output power by more than 20% relative to a standard converter which simply follows the average power.

In one embodiment an input signal 202 to be transmitted is received by RF communication system 220 from processing device 210. The input signal 202 is provided to RF communication system 220 which includes RF signal generator 224, power amplifier (PA) 226, and envelope tracking system 228. RF signal generator 224 may be configured to perform frequency up-conversion from a baseband frequency range to a radio frequency range, and/or digital-to-analog conversion of the input signal 202. Power amplifier 226 amplifies the signal provided by RF signal generator 224, wherein an input power of power amplifier 226 is $P_{IN}$ and an output power is $P_{OUT}$. The amplified amplifier output signal is fed to antenna 230 for transmission. In one embodiment, power amplifier 226 is designed in a different way compared to a traditional power amplifier (which are generally optimized for average power tracking), to allow envelope tracking operation and to maximize efficiency enhancement in an envelope tracking system.

In one embodiment where envelope tracking is utilized, the supply voltage $V_{CC}$ of power amplifier 226 is not a simple linear response to the magnitude of input signal 202. For example, the supply voltage $V_{CC}$ depends on the magnitude of input signal 202 in a nonlinear way, such that the gain of power amplifier 226 is constant and becomes independent of the instantaneous supply voltage $V_{CC}$ when the power amplifier 226 operates in an envelope tracking mode. In one embodiment, a nonlinear transfer function is implemented by envelope tracking system 228.

In one embodiment, envelope tracking system 228 forms a second processing path which is depicted in FIG. 2 above RF signal generator 224. Envelope tracking system 224 may be implemented in any number of different ways. In one embodiment, envelope tracking system 228 determines the instantaneous magnitude of input signal 202, introduces any necessary delays, and synchronizes a variable gain with gain from RF signal generator 224. A lookup table may implement a nonlinear transfer function, and the output is digital-to-analog converted and envelope tracking system 228 provides a corresponding supply voltage $V_{CC}$ to power amplifier 226.

The nonlinear envelope tracking transfer function is typically sensitive to hardware variations of power amplifier 226, RF signal generator 224 and other components of RF communication system 220. As a result the transfer function may be calibrated during production of mobile communication device 200. In one embodiment, the device calibration equipment 104 is connected to the input and output of power amplifier 226. Device calibration equipment 104 may implement the adaptive envelope tracking calibration routine 106 to adaptively adjust a calibration target power value until an output power estimate is greater than the calibration target power value, as described in more detail below.

Figure 3:
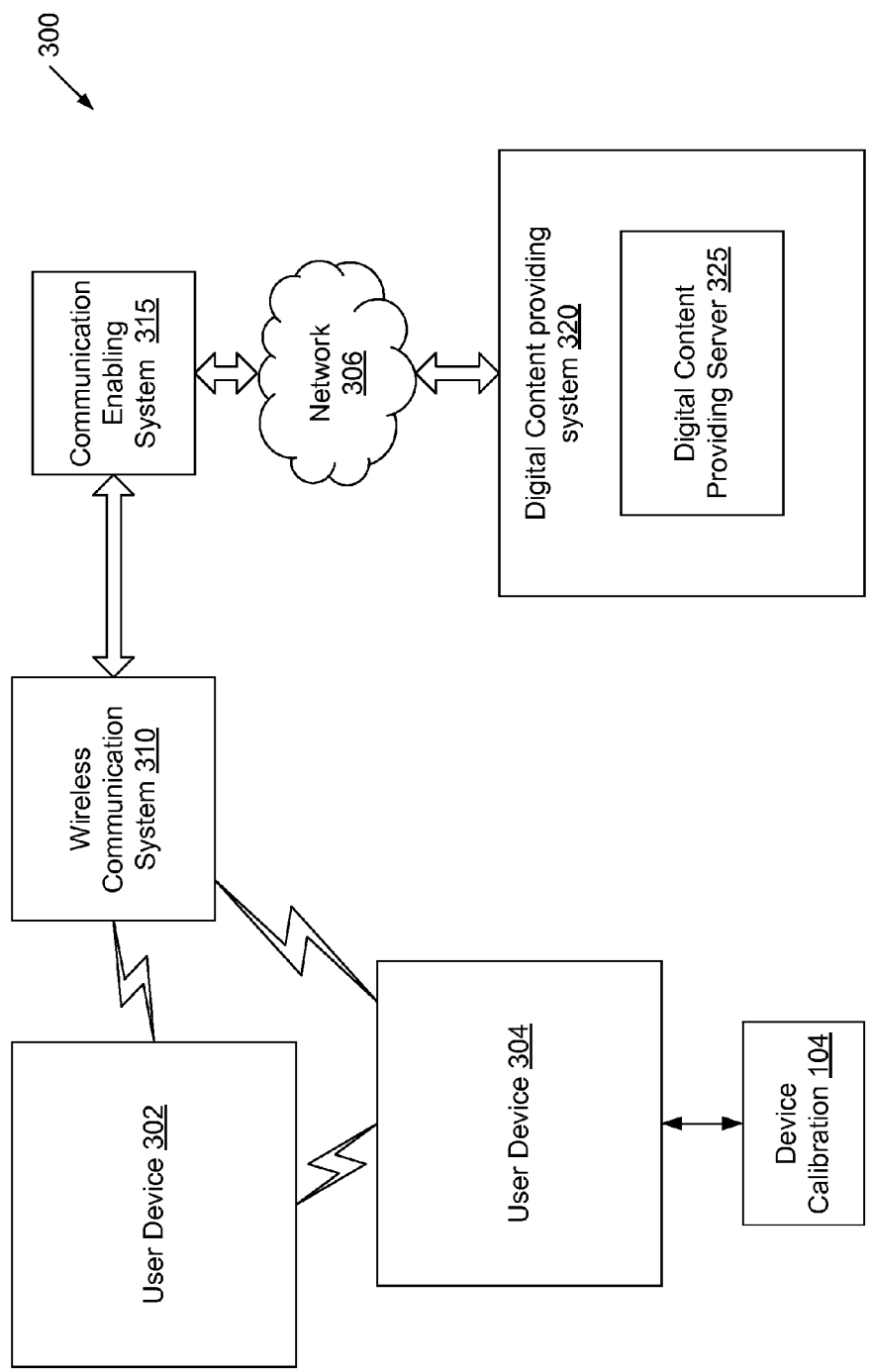
FIG. 3 is a block diagram of an example network architecture, in which embodiments of the present invention may operate.

FIG. 3 is a block diagram of an example network architecture 300, in which embodiments of the present invention described herein may operate. The network architecture 300 may include a digital content providing system 320 and one or more user devices 302, 304 capable of communicating with the digital content providing system 320 via a network 306. Network 306 may include, for example, a public network such as the Internet or a private network such as a local area network (LAN) and may include a wired or wireless network.

The user devices 302, 304 may be portable computing devices such as electronic book readers or tablet computers (e.g., that include a book reader application). Other examples of portable computing devices include cellular telephones, personal digital assistants (PDAs), portable media players, netbooks, and the like. The user devices 302, 304 may also be non-portable computing devices such as a desktop computer, a set-top box associated with a television, a gaming console, and so on. User device 302, 304 may be representative of mobile communication device 200, which implements envelope tracking technology, as described above. The user devices 302, 304 may be variously configured with different features to enable consumption of one or more types of digital content and electronic media items. The digital content and electronic media items may include electronic books (ebooks) and/or other electronic publications (electronic versions of publications) such as electronic magazines, digital newspapers, digital audio books, electronic journals, real simple syndication (RSS) feeds, etc. The media items may also include digital video (e.g., movies, television, short clips, etc.) which may be available from a video-on-demand (VOD) service, images (e.g., art, photographs, etc.), and multi-media content.

The digital content providing system 320 may correspond to any feature or combination of features for providing electronic media items or other digital content to the user devices 302, 304. The digital content providing system 320 may include a network-accessible server-based functionality (digital content providing server 325), various data stores (not shown), and/or other data processing equipment. The digital content providing system 320 may be implemented by a single machine or a cluster of machines. The digital content providing system 320 may include one or more machines (e.g., one or more server computer systems, routers, gateways, etc.) that have processing and storage capabilities to provide the server-based functionality.

In one embodiment, the digital content providing server 325 corresponds to an entity which provides electronic media items (e.g., electronic books, videos) to users upon the users' purchase of the items. In this role, the digital content providing server 325 may essentially act as a bookseller or the like. In other cases, the digital content providing server 325 corresponds to an entity which provides electronic publications to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

The digital content providing server 325 may deliver, and the user devices 302, 304 receive, electronic publications (or other media items), search results, upgrades, and/or other information via the network 306. For example, the user devices 302, 304 may download, stream, or otherwise receive digital video from the digital content providing server 325. The digital content providing server 325 may also receive various requests (e.g., search queries), instructions and other data from the user devices 302, 304 via the network 306.

Communication between the user devices 302, 304 and the item providing system 320 may be enabled via any communication infrastructure. One example of such an infrastructure includes a combination of a wide area network (WAN) and wireless infrastructure, which allows a user to use the user devices 302, 304 to purchase digital content (e.g., digital video or electronic publications) and consume the digital content without being tethered to the digital content providing system 320 via hardwired links. The wireless infrastructure may be provided by one or multiple wireless communications systems, such as wireless communication system 310. In one embodiment, wireless communication system 310 may be a wireless fidelity (WiFi) hotspot connected with the network 306. Wireless communication system 310 may also be a wireless carrier system that can be implemented using various data processing equipment, communication towers, etc. For example, wireless communication system 310 may include a Global System for Mobile Communications (GSM) network, a Universal Mobile Telecommunications System (UMTS) system, a 3GPP Long Term Evolution (LTE) system, or other system. Alternatively, or in addition, the wireless carrier system may rely on satellite technology to exchange information with the user devices 302, 304.

The communication infrastructure may also include a communication-enabling system 315 that serves as an intermediary in passing information between the digital content providing system 320 and the wireless communication system 310. The communication-enabling system 315 may communicate with the wireless communication system 310 (e.g., a wireless carrier) via a dedicated channel, and may communicate with the digital content providing system 320 via a non-dedicated communication mechanism, (e.g., a public Wide Area Network (WAN) such as the Internet).

In addition to wirelessly connecting to wireless communication system 310, user devices 302, 304 may also wirelessly connect to other user devices 302, 304. For example, user device 302 may form a wireless ad hoc (peer-to-peer) network with user device 304 using WiFi, Bluetooth, or other wireless communication protocols.

In one embodiment, device calibration equipment 104 is connected to user device 304 and used to calibrate user device 304. Device calibration equipment 104 may implement the adaptive envelope tracking calibration routine 106 to adaptively adjust a calibration target power value until an output power estimate is greater than the calibration target power value, as described in more detail below.

Figure 4:
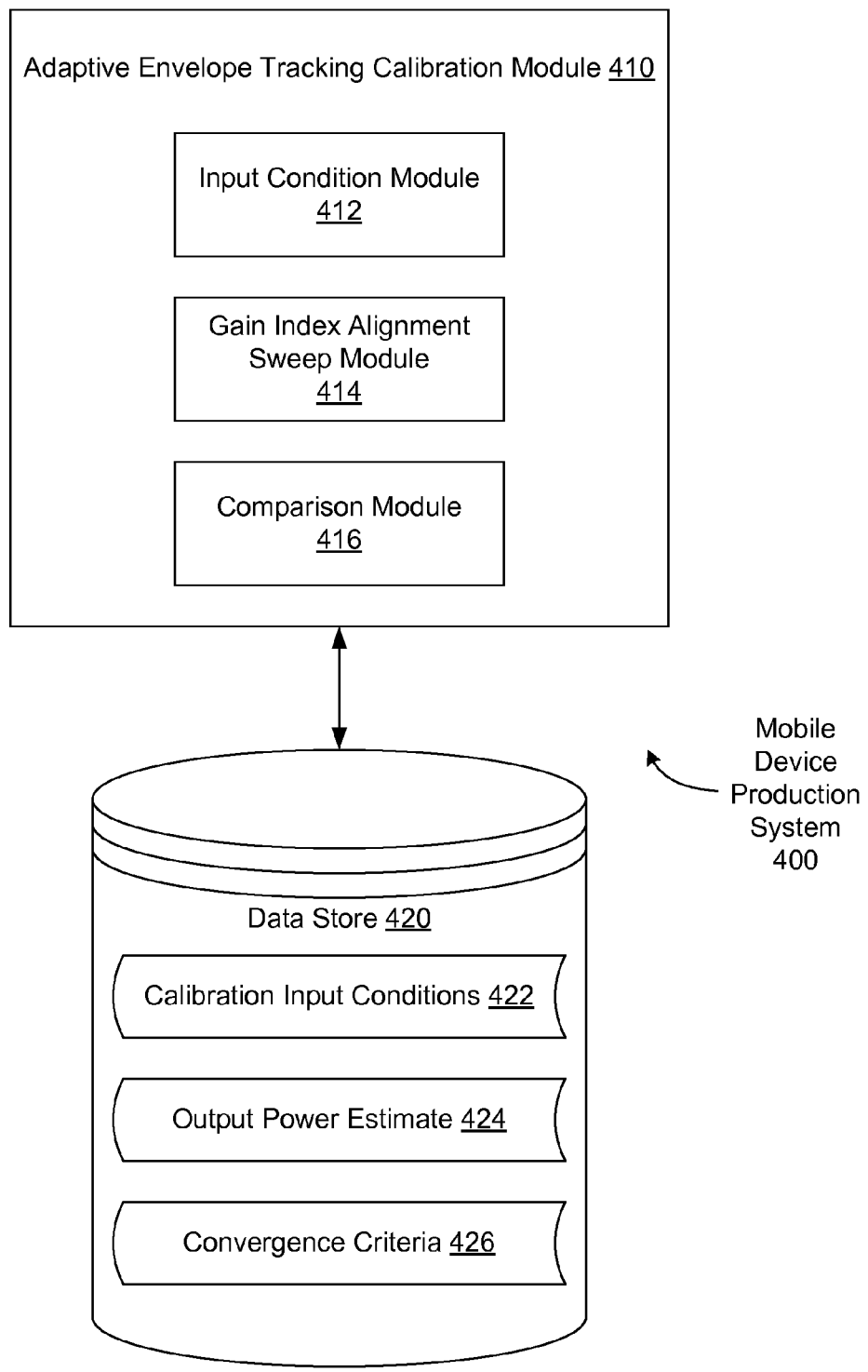
FIG. 4 is a block diagram illustrating an adaptive envelope tracking calibration module, according to an embodiment.

FIG. 4 is a block diagram of one embodiment of an adaptive envelope tracking calibration module 410 that is part of a mobile device production system 400. Adaptive envelope tracking calibration module 410 may provide calibration instructions to execute an adaptive envelope tracking calibration routine used to calibrate mobile communication device 200 of FIG. 2 and other devices. In one embodiment, adaptive envelope tracking calibration module 410 includes input condition module 412, gain index alignment sweep module 414, and comparison module 416. This arrangement of modules and components may be a logical separation, and in other embodiments, these modules or other components can be combined together or separated in further components, according to a particular embodiment. In one embodiment, data store 420 is connected to adaptive envelope tracking calibration module 410 and includes calibration input conditions 422, an output power estimate 424, and convergence criteria 426. In one embodiment mobile device production system 400 may include adaptive envelope tracking calibration module 410 and data store 420. In another embodiment, data store 420 may be external to mobile device production system 400 and may be connected to mobile device production system 400 over a network or other connection. In other embodiments, mobile device production system 400 may include different and/or additional components which are not shown to simplify the description. Data store 420 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, input condition module 412 defines calibration input conditions for the adaptive envelope tracking calibration routine. Input condition module 412 may present a user interface that receives the input conditions input by a user, or input condition module 412 may obtain the calibration input conditions from some other source, such as a memory location or from another computer application program in mobile device production system 400. In one embodiment, input condition module 412 may store the defined input conditions as calibration input conditions 422 in data store 420. In one embodiment, if input conditions are not received, input condition module 412 may use a default set of input conditions.

In one embodiment, the calibration input conditions 422 may include one or more gain index (RGI) alignment points, an initial calibration target power ($TP_{START}$), and an adaptation factor to be used by the adaptive envelope tracking calibration routine. In one embodiment, the RGI alignment points are used to characterize the headroom for the RF communication system. The gain index may correspond to the input power for the power amplifier and may be determined from a statistical average characterizing a sampling of devices of the same type. Accordingly, the RGI alignment points may not be specific to the current device being calibrated, but may be associated with a design of the RF communication system. In one embodiment, the RGI alignment points are used as a seed for the adaptive envelope tracking calibration routine and used to generate a three-dimensional curve for the device across different bias levels, input levels, output levels, etc. to represent the headroom of the device.

In one embodiment, the initial calibration target power is selected based on the expected headroom of the device. The headroom of device refers to an amount by which the actual capabilities of the device (e.g., maximum or potential RF output power) exceed a designated level, such as a desired output level specified by 3GPP, a wireless carrier, or some other party. For example, if the actual target output power is a certain amount (e.g., 24 dB in the case of LTE) and the expected headroom is 2 dB, then the initial target calibration target power may be the sum of the two values (e.g., 26 dB). In one embodiment, the adaptation factor can be used by the adaptive envelope tracking calibration routine to adjust the initial calibration target power and form a current calibration target power ($TP_{CURRENT}$). The current calibration target power may be equal to the initial calibration target power minus the adaptation factor. In one embodiment, the adaptation factor has an initial value of zero, meaning that at first, the current calibration target power is equal to the initial calibration target power. In other embodiments, the adaptation factor may have some other initial value.

In one embodiment, gain index alignment sweep module 414 executes one or more RGI alignment sweeps using the RGI alignment points from calibration input conditions 422. In one embodiment, the RGI alignment sweeps run over the transmit power range to find the maximum transmit power that the device can achieve when operating in an envelope tracking mode. In one embodiment, the RGI alignment sweep uses four RGI alignment points (i.e., four different input power levels) and a test box captures the transmitted signals from the device. The four output power signals are fed back to adaptive envelope tracking calibration module 410, which creates a three-dimensional curve of the results across the different bias levels. In one embodiment, gain index alignment sweep module 414 determines the maximum transmit power from the resulting curve. Gain index alignment sweep module 414 may store this power values as output power estimate 424 in data store 420.

In one embodiment, comparison module 416 performs various comparisons as needed by the adaptive envelope tracking calibration routine. For example, comparison module 416 may compare the output power estimate 424 to the current calibration target power from calibration input conditions 422. In one embodiment, if the output power estimate 424 is greater than the current calibration target power, adaptive envelope tracking calibration module 410 may determine that the current device passes this stage of the calibration and may execute a remainder of a full calibration process for the RF communication system using the current calibration target power. In one embodiment, in addition to envelope tracking calibration, there may be a full calibration routine provided, for example, by the chipset vendor. The full calibration routine may focus on transmission output power on various different channels or frequencies within the desired communication band, as well as receiver calibration for receiving wireless data through antenna 130. In addition, the full calibration routine may include calibration for power amplifier gain ranges that do not use envelope tracking. In another embodiment, comparison module 416 may compare the adaptation factor to a convergence criterion obtained from convergence criteria 426 in data store 420. In one embodiment, the convergence criterion, together with a predefined increase amount for the adaptation factor, corresponds to a number of times that the adaptive envelope tracking calibration routine may be executed for the current device. In one embodiment, the predefined increase amount for the adaptation factor (e.g., 0.5 dB) is one half of the convergence criterion (e.g., 1 dB). Since the initial value of the adaptation factor is zero, the adaptation factor can be increased by the predefined increase amount of 0.5 dB twice, before it reaches the convergence criterion of 1 dB. As a result, in this embodiment, the adaptive envelope tracking calibration routine may be executed twice for the current device. In one embodiment, the convergence criterion is representative of the difference in output power between the most power devices being calibrated and an average or typical device. In other embodiments, convergence criteria 426 may include other values.

Figure 5:
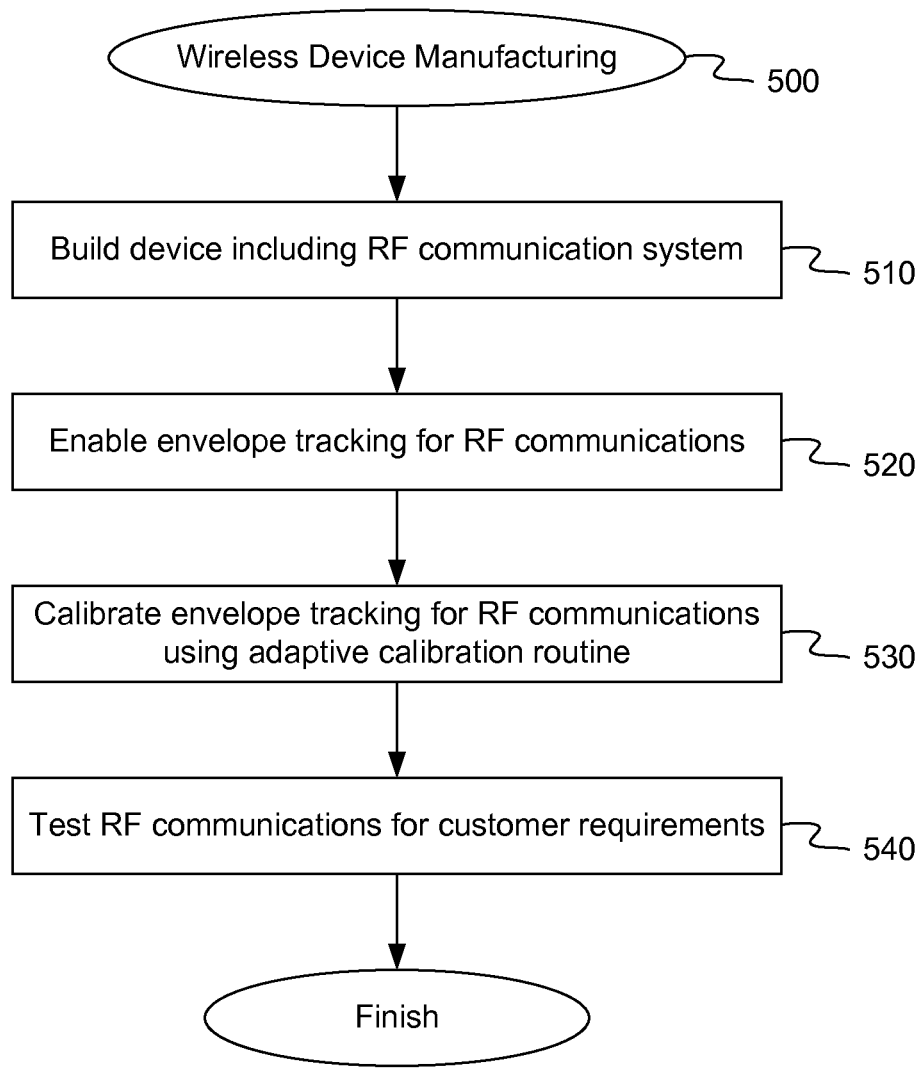
FIG. 5 is a flow diagram illustrating a wireless device manufacturing method, according to an embodiment.

FIG. 5 is a flow diagram illustrating a wireless device manufacturing method, according to an embodiment. The method 500 may be performed by processing logic that comprises hardware (e.g., circuitry, dedicated logic, programmable logic, microcode, etc.), software (e.g., instructions run on a processor to perform hardware simulation), or a combination thereof. The processing logic is configured to manage the manufacturing of a wireless device including adaptive calibration of an envelope tracking system in the device. In one embodiment, method 500 may be performed by mobile device production system 400, as shown in FIG. 4.

Referring to FIG. 5, at block 510, method 500 builds a wireless device 200 including an RF communication system 220. In one embodiment, mobile communication device 200 includes processing device 210 RF communication system 220. In one embodiment, processing device 210 generates signals to be transmitted via the antenna 230 which are forwarded to the RF communication system 220 which generates a transmit signal output to antenna 230 for transmission.

At block 520, method 500 enables envelope tracking for RF communications. In one embodiment, a power amplifier 226 is designed to allow envelope tracking operation and to maximize efficiency enhancement in an envelope tracking system. In one embodiment where envelope tracking is utilized, the supply voltage $V_{CC}$ of power amplifier 226 depends on the magnitude of input signal 202 in a nonlinear way, such that the gain of power amplifier 226 is constant and becomes independent of the instantaneous supply voltage $V_{CC}$ when the power amplifier 226 operates in an envelope tracking mode. In one embodiment, a nonlinear transfer function is implemented by envelope tracking system 228.

At block 530, method 500 calibrates an envelope tracking system 228 for a supply voltage for a power amplifier 226 within the RF communication system 220. In one embodiment adaptive envelope tracking calibration module 410 receives selection of a calibration target power value and determines an output power estimate for the power amplifier at the corresponding supply voltage. Adaptive envelope tracking calibration module 410 implements an adaptive envelope tracking calibration routine that adaptively adjusts the calibration target power value until the output power estimate is greater than the calibration target power value. This can accommodate hardware variations among a plurality of RF communication systems being calibrated. Additional details of the adaptive calibration are described below in connection with FIG. 6.

At block 540, method 500 tests RF communications for compliance with 3GPP or wireless carrier requirements. After calibration is complete, mobile device production system 400 may validate the performance of the device by testing to determine if an output power of device achieves a level specified by certification requirements (e.g., 3GPP), wireless carrier requirements, or desired user performance.

Figure 6:
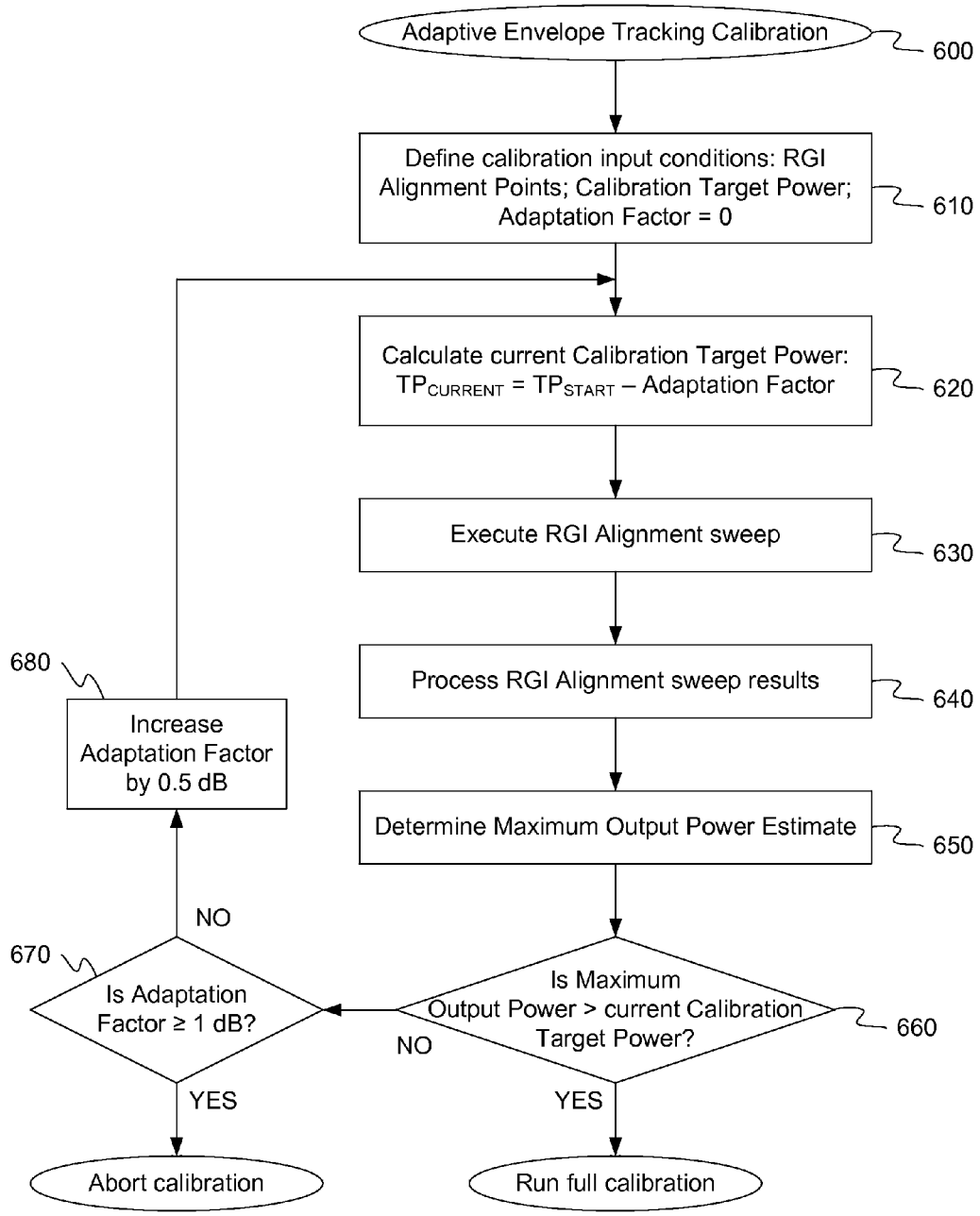
FIG. 6 is a flow diagram illustrating an adaptive envelope tracking calibration method, according to an embodiment.

FIG. 6 is a flow diagram illustrating an adaptive envelope tracking calibration method, according to an embodiment. The method 600 may be performed by processing logic that comprises hardware (e.g., circuitry, dedicated logic, programmable logic, microcode, etc.), software (e.g., instructions run on a processor to perform hardware simulation), or a combination thereof. The processing logic is configured to calibrating an envelope tracking system for a supply voltage for a power amplifier within a radio frequency (RF) communication system. In one embodiment, method 600 may be performed by adaptive envelope tracking calibration module 410, as shown in FIG. 4.

Referring to FIG. 6, at block 610, method 600 defines the calibration input conditions. In one embodiment, input condition module 412 defines calibration input conditions for the adaptive envelope tracking calibration routine. In one embodiment, the calibration input conditions 422 may include one or more gain index (RGI) alignment points, an initial calibration target power ($TP_{START}$), and an adaptation factor to be used by the adaptive envelope tracking calibration routine. For example, in one embodiment, the initial calibration target power may be 26 dB and the initial adaptation factor may be 0 dB.

At block 620, method 600 calculates a current calibration target power $TP_{CURRENT}$. In one embodiment, input condition module 412 uses the adaptation factor to adjust the initial calibration target power and form a current calibration target power ($TP_{CURRENT}$). The current calibration target power may be equal to the initial calibration target power minus the adaptation factor. Since, the initial adaptation factor is 0 dB, the current calibration target power is the same as the initial calibration target power of 26 dB, in this example.

At block 630, method 600 executes an RGI alignment sweep. In one embodiment, gain index alignment sweep module 414 executes one or more RGI alignment sweeps using the RGI alignment points from calibration input conditions 422. In one embodiment, the RGI alignment sweeps run over the transmit power range to find the maximum transmit power that the device can achieve when operating in an envelope tracking mode. In one embodiment, the RGI alignment sweep uses four RGI alignment points (i.e., four different input power levels) and a test box captures the transmitted signals from the device. The four output power signals are fed back to adaptive envelope tracking calibration module 410.

At block 640, method 600 processes the results of the RGI alignment sweep. In one embodiment, gain index alignment sweep module creates a three-dimensional curve of the results from the RGI alignment sweep across the different bias levels.

At block 650, method 600 determines a maximum output power estimate. In one embodiment, gain index alignment sweep module 414 determines the maximum transmit power from the resulting curve. Gain index alignment sweep module 414 may store this power values as output power estimate 424 in data store 420. For the purposes of an example, the maximum output power estimate may be 26.5 dB.

At block 660, method 600 compares the maximum output power estimate to the current calibration target power. In one embodiment, comparison module 416 compare the output power estimate 424 to the current calibration target power from calibration input conditions 422. If the maximum output power estimate is greater than the current calibration target power, method 600 continues to execute the remainder of the full calibration process, as described above. In the example, the maximum output power estimate of 26.5 dB is greater than the current calibration target power of 26 dB, so the device passes calibration.

If the maximum output power estimate is not greater than the current calibration target power, at block 670, method 600 compares the adaptation factor to a convergence criterion. In an example, where the maximum output power estimate is 25.1 dB, the maximum output power estimate is not greater than the current calibration target power of 26 dB. Accordingly, comparison module 416 may compare the adaptation factor of 0 dB to a convergence criterion (e.g., 1 dB) obtained from convergence criteria 426 in data store 420. If the adaptation factor is greater than or equal to the convergence criterion, method 600 aborts the calibration. If the adaptation factor is not greater than or equal to the convergence criterion, at block 680, method 600 increases the adaptation factor. Since, the adaptation factor of 0 dB is not greater than or equal to the convergence criterion of 1 dB, input condition module 412 may increase the adaptation factor by a predefined amount (e.g., 0.5 dB) by adding the predefined amount to the initial value (e.g., 0 dB). Thus, the increased adaptation factor has a value of 0.5 dB.

In one embodiment, method 600 returns to block 620, recalculates the current calibration target power $TP_{CURRENT}$ based on the increased adaptation factor, and repeats the operations at blocks 630-680, as needed. At block 620, input condition module 412 determines that the new current calibration target power is 25.5 dB (i.e., 26 dB−0.5 dB) and at block 660, comparison module 416 determines that the maximum output power estimate is 25.1 is still not greater than the current calibration target power of 25.5 dB. At block 670, comparison module 416 determines that the adaptation factor of 0.5 dB is not greater than or equal to the convergence criterion of 1 dB, so at block 680, input condition module 412 increases the adaptation factor by 0.5 dB to 1 dB and the routine repeats again.

At block 620, input condition module 412 determines that the new current calibration target power is 25 dB (i.e., 26 dB−1 dB) and at block 660, comparison module 416 determines that the maximum output power estimate is 25.1 is greater than the current calibration target power of 25 dB. Accordingly, the routine ends.

In another embodiment, where the current calibration target power is 25 dB (i.e., an initial calibration target power of 26 dB−an adaptation factor of 1 dB), and the maximum output power estimate is 24.9 dB, at block 660, comparison module 416 determines that the maximum output power estimate is 24.9 is not greater than the current calibration target power of 25 dB. At block 670, comparison module 416 determines that the adaptation factor of 1 dB is greater than or equal to the convergence criterion of 1 dB, so the calibration routine is aborted.

Figure 7:
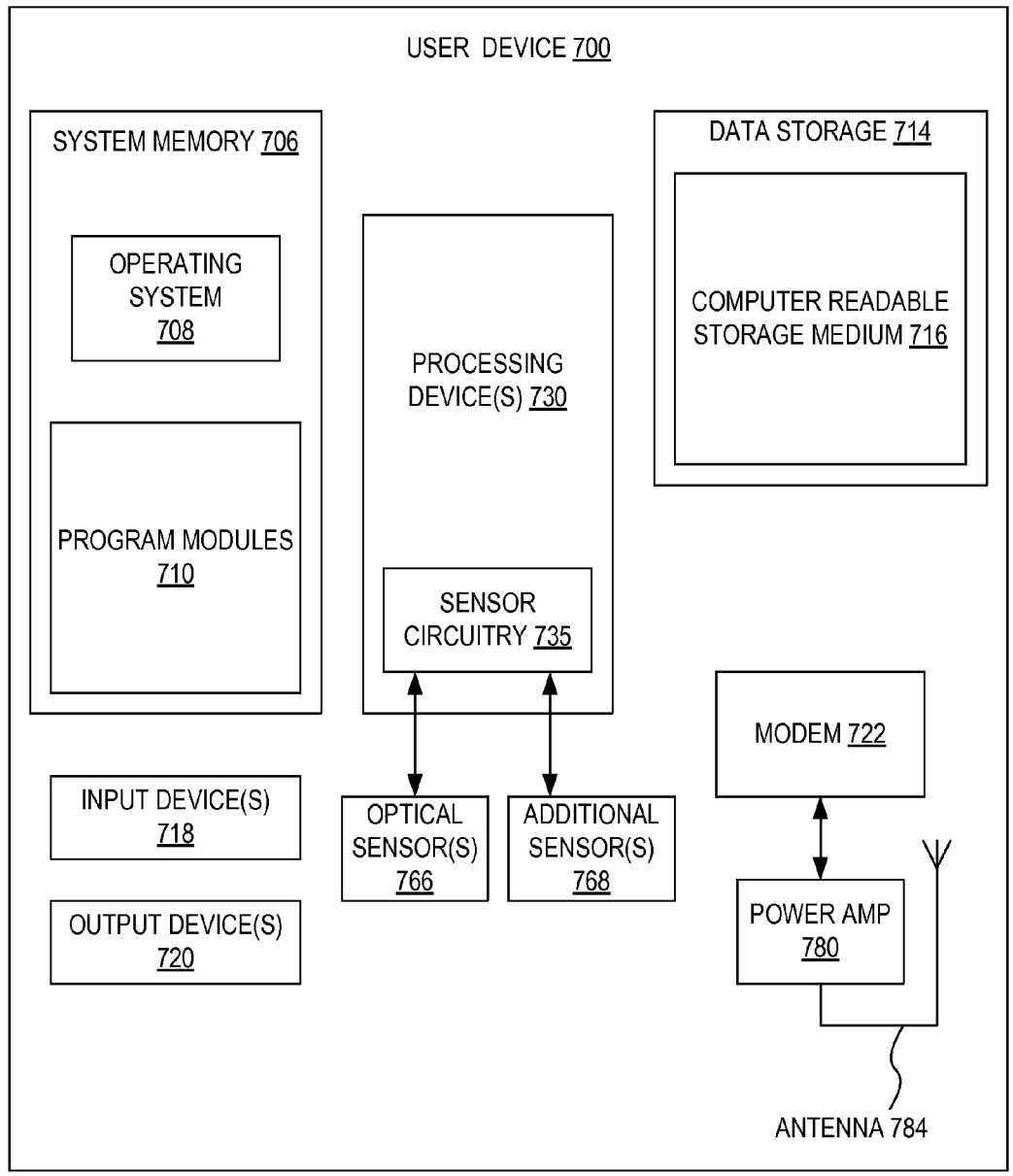
FIG. 7 is a block diagram illustrating an exemplary user device, according to an embodiment.

FIG. 7 is a block diagram illustrating an exemplary user device 700, according to an embodiment. In one embodiment, the user device 700 may correspond to mobile communication device 200 of FIG. 2 and may be any type of user device such as an electronic book reader, a PDA, a mobile phone, a laptop computer, a portable media player, a tablet computer, an electronic pad, a desktop computer, a camera, a video camera, a netbook, and the like.

The user device 700 includes one or more processing devices 730, such as one or more CPUs, microcontrollers, field programmable gate arrays, or other types of processors. In one embodiment, processing devices 730 correspond to processing device 210 of FIG. 2. The user device 700 also includes system memory 706, which may correspond to any combination of volatile and/or non-volatile storage mechanisms. The system memory 706 stores information which provides an operating system component 708, various program modules 710, and/or other components. The user device 700 performs functions by using the processing device(s) 730 to execute instructions provided by the system memory 706.

The user device 700 also includes a data storage device 714 that may be composed of one or more types of removable storage and/or one or more types of non-removable storage. The data storage device 714 includes a computer-readable storage medium 716 on which is stored one or more sets of instructions embodying any one or more of the methodologies or functions described herein. As shown, the instructions may reside, completely or at least partially, within the computer readable storage medium 716, system memory 706 and/or within the processing device(s) 730 during execution thereof by the user device 700, the system memory 706 and the processing device(s) 730 also constituting computer-readable media. The user device 700 may also include one or more input devices 718 (keyboard, mouse device, specialized selection keys, etc.) and one or more output devices 720 (displays, printers, audio output mechanisms, etc.).

The user device 700 further includes a wireless modem 722 to allow the user device 700 to communicate via a wireless network (e.g., such as provided by the wireless communication system) and/or with other computing devices, such as remote computers, the item providing system, online book stores, electronic catalogs for libraries, and so forth. The wireless modem 722 may allow the user device 700 to handle both voice and non-voice communications (such as communications for text messages, multimedia messages, media downloads, web browsing, etc.) with the wireless communication system. The wireless modem 722 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi, etc. The wireless modem 722 may generate signals and send these signals to power amplifier (amp) 780 for amplification, after which they are wirelessly transmitted via antenna 784. In addition to sending data, antenna 784 also receives data, which is sent to wireless modem 722 and transferred to processing device(s) 730. In one embodiment, modem 722, power amplifier 780 and antenna 784 are part of RF communication system 220, as shown in FIG. 2.

In one embodiment, user device 700 includes an optical sensor 766. The optical sensor 766 may be a low resolution camera (e.g., having 0.2 or 0.3 Megapixels) that takes images (e.g., of a user's eyes) on a periodic basis. Alternatively, the optical sensor 766 may have a higher resolution, such as 1 Megapixel up to 10 or more Megapixels. The optical sensor 766 may be positioned such that images are taken of a user's face while the user holds the user device 700 in front of his face in a standard reading position. Therefore, the optical sensor 766 may be used to track user eye movement during reading.

In one embodiment, user device 700 includes one or more additional sensors 768 such as a physical contact sensor, close proximity sensors, or motion sensors. The sensors 768 can detect the presence of human body parts, and convey information regarding the detected presence to processing device(s) 730. In one embodiment, the sensors 768 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 768 may also be optical (e.g., infrared) sensors that use an emitter and receiver pair to detect the presence of opaque objects. Alternatively, the sensors 768 may be inductive sensors, which include an inductive loop. When the presence of a human body part (or metal object) is brought close to the inductive sensor, an induction of the inductive loop changes, causing the human body part to be detected. Alternatively, the sensors 768 may be ultrasonic sensors that emit an ultrasonic signal and measure a time duration between when a signal is transmitted and the reflection of that signal received (a.k.a., flight response). The sensors 768 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part, other types of objects may also be detected depending on the sensing technologies used.

In one embodiment, the additional sensors 768 include a motion sensor, such as an accelerometer or one or more gyroscopes. The user device 700 may use motion data from motion sensors to determine whether a user is holding the user device 700. For example, if the user device 700 experiences constant minor accelerations, it may be determined that the user device 700 is being held in a user's hand. Additionally, if the user device 700 is at a particular angle (detectable based on acceleration readings from an accelerometer), it may be determined that the user device 700 is being rested on a user's leg during reading.

The processing device(s) 730 may include sensor circuitry 735 (e.g., sensor device drivers) that enables the processing device (s) 730 to interpret signals received from the optical sensor(s) 766 and/or additional sensors 768. In one embodiment, the optical sensors 766 and/or additional sensors 768 output raw sensor data. In another embodiment, the optical sensors 766 and/or additional sensors 768 output fully processed signals to the processing device (s) 730. For example, the additional sensors 768 may output a user contact/no user contact signal using a single line interface or a multi-line interface. In another embodiment, the additional sensors 768 output, for example, positional data and/or object presence data (e.g., of a human body part) to the processing device 730 without first processing the data. In either instance, the processing device 730 may use the sensor circuitry 735 to process and/or interpret the received data. If data is received from multiple sensors, processing the data may include averaging the data, identifying a maximum from the data, or otherwise combining the data from the multiple sensors.

Figure 8:
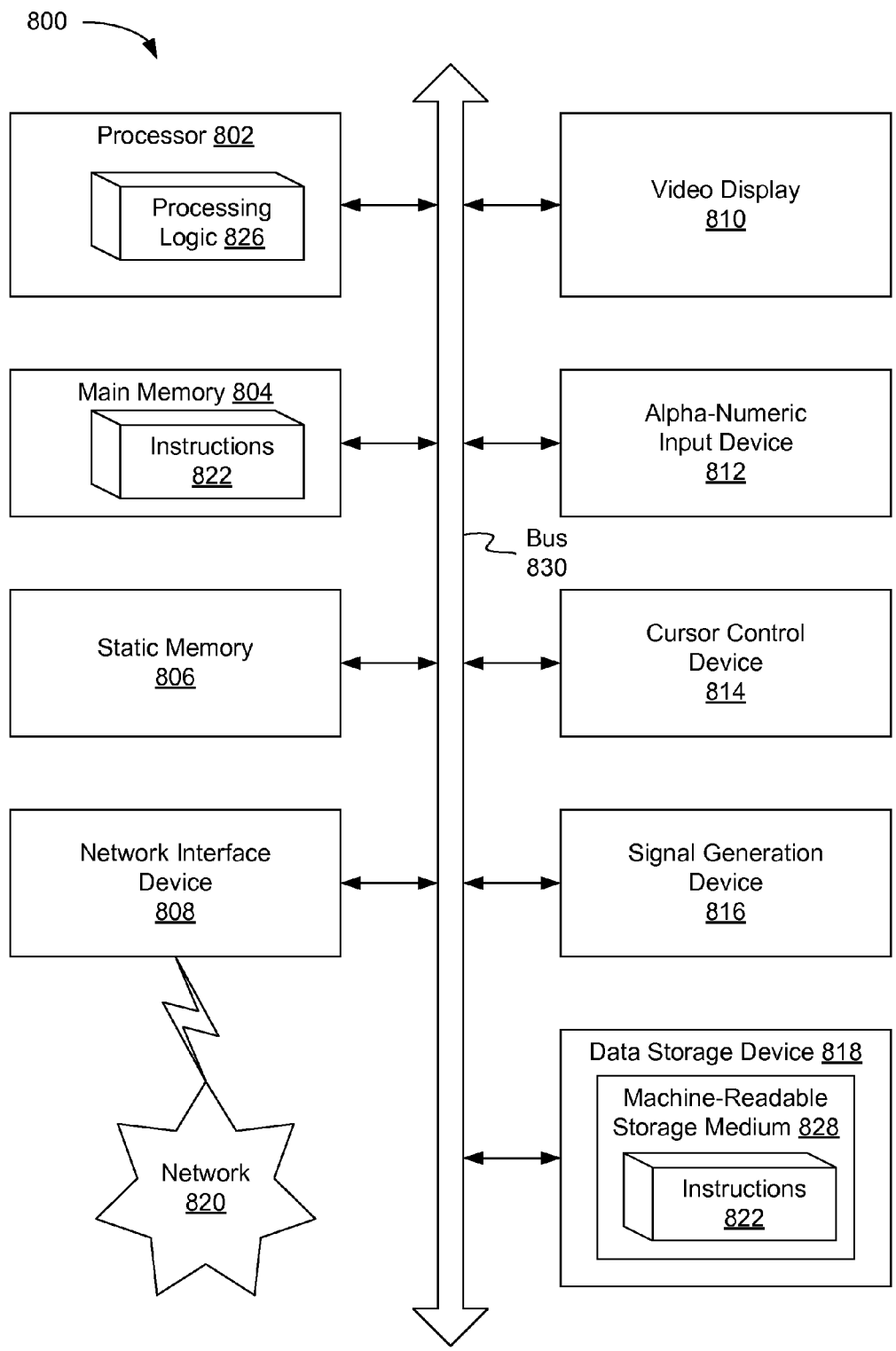
FIG. 8 is a block diagram illustrating one embodiment of a computer system, according to an embodiment.

FIG. 8 illustrates a diagrammatic representation of a machine in the exemplary form of a computer system 800 within which a set of instructions, for causing the machine to perform any one or more of the methodologies discussed herein, may be executed. The system 800 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may represent mobile device production system 400 of FIG. 4.

The exemplary computer system 800 includes a processing system (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 818, which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 may be configured to execute the adaptive envelope tracking calibration module 410 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable medium 828 on which is stored one or more sets of instructions 822 embodying any one or more of the methodologies or functions described herein. For example, the instructions 822 may include instructions for adaptive envelope tracking calibration, as described herein. The instructions 822 may also reside, completely or at least partially, within the main memory 804 and/or within processing logic 826 of the processor 802 during execution thereof by the computer system 800, the main memory 804 and the processor 802 also constituting computer-readable media. The instructions may further be transmitted or received over a network 820 via the network interface device 808.

While the computer-readable storage medium 828 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for calibrating a radio frequency (RF) transmitter in a communication device comprising an envelope tracking system, the method comprising:
    receiving a selection of calibration input conditions, the calibration input conditions comprising a plurality of gain index alignment points to serve as input power levels for a power amplifier of the RF transmitter, an initial calibration target power that is greater than a desired output power of the RF transmitter, and an adaptation factor comprising an initial value of zero;
    determining a current calibration target power by calculating a difference between the initial calibration target power and the adaptation factor;
    executing, by a processing device, a gain index alignment sweep using the plurality of gain index alignment points to determine an output power estimate for the power amplifier as a supply voltage for the power amplifier varies according to an output of the envelope tracking system;
    comparing the output power estimate to the current calibration target power;
    determining that the output power estimate is not greater than the current calibration target power;
    comparing the adaptation factor to a convergence criterion, the convergence criterion corresponding to a number of times that an adaptive envelope tracking calibration routine may be executed for the RF transmitter;
    determining that the adaptation factor is not greater than or equal to the convergence criterion; and
    increasing the adaptation factor by a predefined amount by adding the predefined amount to the initial value, wherein the predefined amount comprises one half of the convergence criterion.

2. The method of claim 1, further comprising:
    determining that the output power estimate is greater than the initial calibration target power; and
    determining that the RF transmitter has passed the calibration.

3. The method of claim 1, further comprising:
    determining that the adaptation factor is greater than or equal to the convergence criterion; and
    determining that the RF transmitter has failed the calibration.

4. The method of claim 1, wherein executing the gain index alignment sweep using the plurality of gain index alignment points to determine the output power estimate comprises:
    applying each of the plurality of gain index alignment points to the power amplifier as input power levels;
    measuring output power signals from the power amplifier corresponding to each of the input power levels; and
    plotting the output power signals against the input power levels and the supply voltage for the power amplifier.

5. A system comprising:
a memory to store an adaptive envelope tracking calibration routine; and
a processing device operatively coupled to the memory, the processing device to execute the adaptive envelope tracking calibration routine to calibrate a radio frequency (RF) transmitter in a communication device comprising an envelope tracking system, wherein to calibrate the RF transmitter, the processing device is configured to:
receive a selection of an initial calibration target power, wherein the initial calibration target power is greater than a desired output power of the RF transmitter;
determine an output power estimate for a power amplifier in the RF transmitter as a supply voltage for the power amplifier varies according to an output of the envelope tracking system; and
adaptively adjust the initial calibration target power to generate a new calibration target power different from the initial calibration target power when the output power estimate is not greater than the initial calibration target power.

6. The system of claim 5, wherein the processing device is further configured to:
define calibration input conditions for calibrating the envelope tracking system, the calibration input conditions comprising at least one gain index alignment point, the initial calibration target power, and an adaptation factor.

7. The system of claim 6, wherein the processing device is further configured to:
determine a current calibration target power by calculating a difference between the initial calibration target power and the adaptation factor.

8. The system of claim 6, wherein to determine the output power estimate for the power amplifier, the processing device is further configured to execute a gain index alignment sweep using the at least one gain index alignment point.

9. The system of claim 6, wherein the processing device is further configured to:
compare the output power estimate to a current calibration target power, the current calibration power being a difference between the initial calibration target power and the adaptation factor; and
determine that the output power estimate is not greater than the current calibration target power.

10. The system of claim 6, wherein the processing device is further configured to:
compare the adaptation factor to a convergence criterion;
determine that the adaptation factor is not greater than or equal to the convergence criterion; and
increase the adaptation factor by a predefined amount.

11. The system of claim 5, wherein the processing device is further configured to:
adaptively adjust the initial calibration target power when an adaptation factor has not reached a convergence criterion, the convergence criterion corresponding to a number of times that an adaptive envelope tracking calibration routine may be executed for the RF transmitter.

12. The system of claim 5, wherein the processing device is further configured to:
when the output power estimate is greater than the initial calibration target power, determine that the RF transmitter has passed the calibration.

13. A method comprising:
receiving a selection of a calibration target power for calibration of a radio frequency (RF) transmitter in a communication device comprising an envelope tracking system, the RF transmitter having a desired output power, wherein the calibration target power is greater than the desired output power;
determining, by a processing device, an output power estimate for a power amplifier in the RF transmitter as a supply voltage for the power amplifier varies according to an output of the envelope tracking system;
when the output power estimate does not exceed the calibration target power, reducing the calibration target power by a predetermined amount to form a reduced calibration target power; and
when the output power estimate exceeds the reduced calibration target power, determining that the RF transmitter has passed the calibration.

14. The method of claim 13, further comprising:
receiving a selection of calibration input conditions for the calibration of the RF transmitter, the calibration input conditions comprising at least one gain index alignment point, the selected calibration target power, and an adaptation factor.

15. The method of claim 14, further comprising:
determining a current calibration target power by calculating a difference between the selected calibration target power and the adaptation factor.

16. The method of claim 14, wherein determining the output power estimate for the power amplifier comprises executing a gain index alignment sweep using the at least one gain index alignment point.

17. The method of claim 14, further comprising:
comparing the output power estimate to a current calibration target power, the current calibration power being a difference between the selected calibration target power and the adaptation factor; and
determining that the output power estimate is not greater than the current calibration target power.

18. The method of claim 14, further comprising:
comparing the adaptation factor to a convergence criterion;
determining that the adaptation factor is not greater than or equal to the convergence criterion; and
increasing the adaptation factor by the predetermined amount.

19. The method of claim 13, further comprising:
adaptively adjusting the calibration target power when an adaptation factor has not reached a convergence criterion, the convergence criterion corresponding to a number of times that an adaptive envelope tracking calibration routine may be executed for the RF transmitter.

20. The method of claim 13, further comprising:
when the output power estimate exceeds the calibration target power, determining that the RF transmitter has passed the calibration.

* * * * *